US009208082B1

(12) United States Patent
Cheriton et al.

(10) Patent No.: US 9,208,082 B1
(45) Date of Patent: Dec. 8, 2015

(54) HARDWARE-SUPPORTED PER-PROCESS METADATA TAGS

(71) Applicant: David R. Cheriton, Palo Alto, CA (US)

(72) Inventors: David R. Cheriton, Palo Alto, CA (US); Alexandre Y. Solomatnikov, San Mateo, CA (US)

(73) Assignee: David R. Cheriton, Palo Alto, CA (US)

( * ) Notice: Subject to any disclaimer, the term of this patent is extended or adjusted under 35 U.S.C. 154(b) by 310 days.

(21) Appl. No.: 13/712,878

(22) Filed: Dec. 12, 2012

Related U.S. Application Data

(60) Provisional application No. 61/615,103, filed on Mar. 23, 2012.

(51) Int. Cl.

| | |
|---|---|
| ***G06F 12/00*** | (2006.01) |
| ***G06F 12/06*** | (2006.01) |
| ***G06F 12/08*** | (2006.01) |
| ***G06F 12/10*** | (2006.01) |
| ***G06F 17/30*** | (2006.01) |

(52) U.S. Cl.
CPC ............ *G06F 12/06* (2013.01); *G06F 12/0802* (2013.01); *G06F 12/109* (2013.01); *G06F 17/30997* (2013.01)

(58) Field of Classification Search
CPC .............. G06F 12/109; G06F 12/0802; G06F 17/30997; G06F 12/06
See application file for complete search history.

(56) References Cited

U.S. PATENT DOCUMENTS 4,079,451 A * 3/1978 Woods et al. ................ 711/220
5,881,379 A * 3/1999 Beier et al. .................. 711/100
6,044,367 A * 3/2000 Wolff ........................... 707/704
6,721,764 B2 * 4/2004 Hitz et al. ...................... 714/15
6,725,392 B1 * 4/2004 Frey et al. .................... 714/6.12
6,950,438 B1 * 9/2005 Owen et al. .................. 370/409
7,246,200 B1 * 7/2007 van Rietschote et al. ..... 711/114
8,290,911 B1 * 10/2012 Janakiraman et al. ........ 707/640
8,370,577 B2 * 2/2013 Sheaffer et al. .............. 711/118
2003/0009630 A1 * 1/2003 Morris et al. ................ 711/133
2003/0095557 A1 * 5/2003 Keller et al. ................. 370/412
2003/0106040 A1 * 6/2003 Rubin et al. .................. 717/106
2004/0130620 A1 * 7/2004 Buehler et al. ............... 348/143
2004/0268052 A1 * 12/2004 Glasco .......................... 711/141
2005/0015775 A1 * 1/2005 Russell et al. ................ 719/315
2005/0234989 A1 * 10/2005 Bailey et al. ............... 707/104.1
2005/0283489 A1 * 12/2005 Shiozawa et al. ............. 707/100
2006/0155774 A1 * 7/2006 Sachedina et al. ............ 707/200
2007/0180000 A1 * 8/2007 Mine et al. .................... 707/204
2008/0034168 A1 * 2/2008 Beaman ........................ 711/154

(Continued)

OTHER PUBLICATIONS

Ekman et al., A Robust Main-Memory Compression Scheme, Department of Computer Science and Engineering, 2005.

(Continued)

*Primary Examiner* — Cheng-Yuan Tseng
*Assistant Examiner* — Rocio Del Mar Perez-Velez
(74) *Attorney, Agent, or Firm* — Van Pelt, Yi & James LLP

(57) ABSTRACT

A memory controller is used to receive a first request for a portion of a physical memory and metadata associated with the portion of the physical memory. The first request for the portion of the physical memory is translated to correspond to an indirect data structure. The indirect data structure comprises a reference to a data line, and a metadata associated with the data line. The data line is formed within the physical memory.

26 Claims, 8 Drawing Sheets

(56) References Cited

U.S. PATENT DOCUMENTS

2008/0183958 A1* 7/2008 Cheriton ........................ 711/108
2009/0282397 A1* 11/2009 Leporini et al. .............. 717/174
2010/0106912 A1* 4/2010 Cypher et al. ................ 711/141
2010/0262578 A1* 10/2010 Arimilli et al. ............... 707/609
2010/0332716 A1* 12/2010 Sheaffer et al. .................. 711/3
2011/0010347 A1* 1/2011 Cheriton et al. .............. 707/692
2011/0072221 A1* 3/2011 Rousseau ...................... 711/154
2011/0099537 A1* 4/2011 Van Ness et al. ............ 717/120
2011/0185129 A1* 7/2011 Landau et al. ................ 711/147
2011/0231713 A1* 9/2011 Takada et al. ................. 711/103
2011/0264669 A1* 10/2011 Lu et al. ........................ 707/747
2012/0194741 A1* 8/2012 Hyun ............................ 348/564
2012/0221828 A1* 8/2012 Fang et al. .................... 711/206
2012/0255003 A1* 10/2012 Sallam ............................ 726/23
2012/0297256 A1* 11/2012 Plondke et al. ............... 711/105
2012/0324196 A1* 12/2012 Maillet et al. ................. 711/170
2013/0019062 A1* 1/2013 Bennett et al. ................ 711/114
2013/0024645 A1* 1/2013 Cheriton et al. .............. 711/206
2013/0031331 A1* 1/2013 Cheriton et al. .............. 711/206
2013/0036289 A1* 2/2013 Welnicki et al. .............. 711/173
2013/0275699 A1* 10/2013 Cheriton ....................... 711/162
2014/0189270 A1* 7/2014 Iwanicki et al. .............. 711/162
2014/0244877 A1* 8/2014 Williamson .................. 710/262
2014/0258660 A1* 9/2014 Cheriton ....................... 711/162
2014/0258777 A1* 9/2014 Cheriton ......................... 714/19

OTHER PUBLICATIONS

Abali et al., Memory Expansion Technology (MXT): Software Support and Performance, IBM J. Res & Dev., vol. 45, No. 2, Mar. 2001.

* cited by examiner

HARDWARE-SUPPORTED PER-PROCESS METADATA TAGS

CROSS REFERENCE TO OTHER APPLICATIONS

This application claims priority to U.S. Provisional Patent Application No. 61/615,103 entitled HARDWARE-SUPPORTED PER-PROCESS METADATA TAGS filed Mar. 23, 2012 which is incorporated herein by reference for all purposes.

BACKGROUND OF THE INVENTION

In the history of computing, there have been a number of tagged computer architectures, including the Lisp Machine and certain Burroughs computer systems. In such an architecture, a word of memory is partitioned by the hardware into a data portion and a tag portion, wherein the tag portion contains metadata with regards to the corresponding data portion.

These architectures have been unsuccessful in part because there are alternative software solutions that do not impose as high a cost as that of historical systems in hardware. For example, historical systems have a memory cost and/or a complexity cost to provide tags in hardware. There is a need for more efficient, software-accessible and compatible tagging mechanisms supported in hardware.

BRIEF DESCRIPTION OF THE DRAWINGS

Various embodiments of the invention are disclosed in the following detailed description and the accompanying drawings.

DETAILED DESCRIPTION

Figure 1:
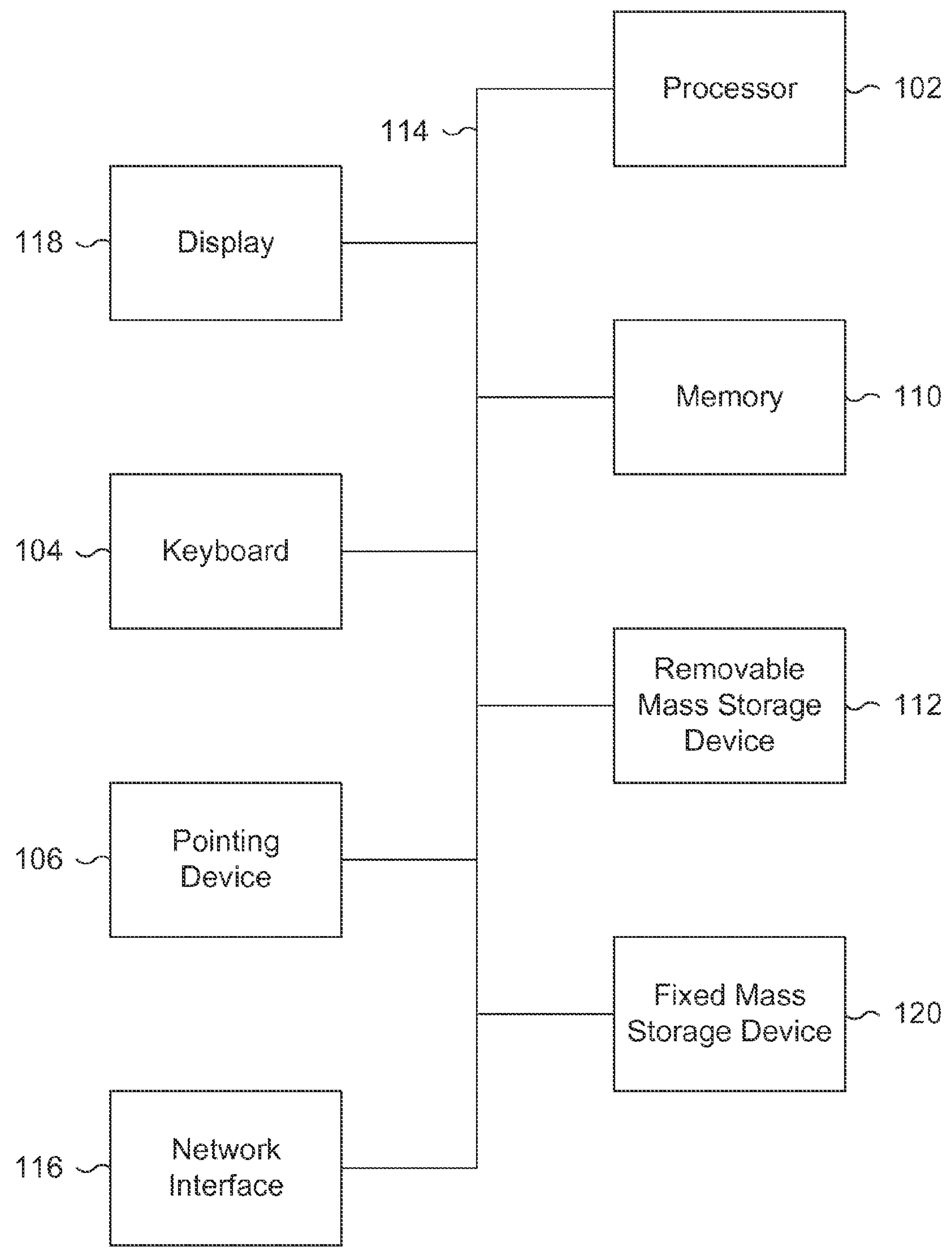
FIG. 1 is a functional diagram illustrating a programmed computer system for distributed workflows in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Historical Tagging Systems

Type and Protection.

One historical hardware tagging system includes a word of memory partitioned by the hardware into a data portion and a tag portion, with the data portion normally being the size of a pointer. The tag portion is used to describe how the data portion is to be interpreted.

In particular, it is feasible to compile in this tag knowledge when a program is statically typed. Dynamically typed languages may have not reached sufficient commercial importance to drive such an architectural change. Thus, this tagging has no compelling benefits in real applications compared to the memory cost and the complexity cost to provide these tags in hardware. Other uses of tagging for protection have been subsumed by the protection provided at a page granularity by virtual memory page table-based and Transaction Lookaside Buffer ("TLB")-based address translation mechanisms.

Processing Step.

Another category of metadata is that which is associated with a particular processing step, rather than intrinsically associated with the data. For example, a processing step may tag some subset of the elements in a collection as "dirty" or "modified" to indicate those that have changed since an earlier time and thus need some additional processing to accommodate these changes. This metadata tagging information is dynamic; that is, computed at run-time, and so cannot be replaced by static techniques.

However, this metadata tagged information is not suitable to support with the historical tagged architectures because, in those systems, the tags are stored directly with the data and the data may be shared by several different computational processes. Two or more processes may have conflicting uses of the metadata associated with the data, making it infeasible to store with the data. For example, one process is tagging an element as part of its processing while another has this same element untagged as part of its own processing. Copying the data to make a process use a separate copy as part of the processing step, to avoid this sharing, incurs a cost that negates the performance benefits of hardware-supported tagging.

Relatedly, providing several tags for different processing steps/threads incurs the space overhead of the tags on all data, whether or not the tags are actually being used. Considering the potential of processor architectures supporting hundreds of cores, the amount of metadata required to avoid conflicts even with one bit per core would be excessive.

Software Tagging.

Conventional software programming employs a separate metadata data structure that stores the per-process metadata associated with a collection. For example, a process that needs to tag some entries in a collection for further processing may create a metadata collection corresponding to the actual collection it is processing, with an entry per member in the actual collection storing the associated metadata. This incurs an extra space cost because of the collection representation overhead; for example, "next" pointers between members of the collection. It also incurs processing overhead to instantiate and to use.

For example, if the metadata collection simply logically tags the members of a collection that need extra processing, the extra processing is performed by iterating over the metadata collection to determine each such member, and then locating the associated member in the actual collection, often by a key lookup. The metadata collection could store in each entry a pointer to the corresponding element in the actual collection except in many applications, the process has to be prepared for the corresponding element being deleted from the actual collection or moved between memory locations. Alternatively, the processing can iterate over the actual collection, looking up and checking the corresponding metadata in the metadata collection. These overheads are significant compared to being able to simply check a tag directly associated or stored with each entry in the actual collection.

Page-Level Granularity.

In some systems, some tags are associated with virtual memory pages that provide information on a page granularity; for example, "dirty", referenced, etc. However, this tagging is provided primarily for the use of the virtual memory system and only incidentally usable by applications. For example, the "dirty" tag indicates whether or not the page has been modified since the last time the virtual memory system wrote that page to backing store, not since some application-specific time.

Moreover, the granularity of tagging is at the page-level, namely 4 or 8 kilobytes or larger, which is substantially larger than a typical software element. This size of virtual memory page is chosen to allow a compact and efficient representation of the overall page table required to map virtual memory addresses to physical addresses, and so is not feasible to reduce significantly. In fact, the trend is for larger page sizes, such as 2 Megabytes, to minimize page table size with increasing memory size and to reduce the nested page table lookup cost in virtualized data centers. In contrast to the page table size, common software objects are often 64 bytes or smaller. Aligning software objects to page boundaries to use the tagging at page granularity would incur an unacceptable space overhead.

Data Compression.

In other cases, hardware tags are used to indicate aspects of data compression, as with IBMs MX technology, wherein the control flags may be strictly under the control of the implementation and independent of applications; not necessarily metadata tags that have application-specific meaning.

An efficient software-accessible and compatible tagging mechanism that supports per-process metadata (for example, having process semantics) is disclosed.

Hardware-Supported Per-Process Metadata Tag System Overview

In one embodiment, hardware memory is structured into physical pages, where each physical page is represented as one or more indirect lines that map each data location in the physical page to an actual data line location in memory. Thus, the indirect line contains a physical line ID ("PLID") for each data line in the page. It also contains k tag bits per PLID entry, where k is 1 or some larger number, for example 1-8 bits. Thus in some embodiments, the metadata tags are on PLIDs, and directly in the data.

When a process seeks to use the metadata tags associated with lines in some portion of its address space, for each page that is shared with another process such that the metadata tag usage might conflict, a copy of the indirect line for that page is created, ensuring a separate per-process copy of the tags as contained in the indirect line. Because the indirect line is substantially smaller than the virtual memory page, the copy is relatively efficient. For example, with 32-bit PLIDs and 64-byte data lines, an indirect line is 256 bytes to represent a 4 kilobyte page, 1/16 the size of the data.

Also, storing the metadata in the entries in an indirect line avoids expanding the size of each data word of memory to accommodate tags, as has been done in prior art architectures. A word of memory is generally 64-bits at present. The size of field required to address data lines is substantially smaller, allowing space for metadata, making it easier and less expensive to accommodate the metadata.

An example of a use of hardware-supported per-process metadata/tag systems besides the ones given above includes having two or more applications process a large data set. The large data set in memory may include a large database of resident records. A national security application may process and tag a data line in the large data set if the data line is associated with a call regarding known terrorist operative active in the last 24 hours, which may be a very small percentage of the records. A second application may process and tag a data line in the set as the application finds data lines associated with all males of specific citizenship over thirty-five years of age, a significantly larger percentage of the records. With metadata in the indirect line, each of the two applications interprets tags differently and tags the records differently.

Another example is the use of hardware metadata associated with PLIDs in indirect/translation lines to do dirty copy (for VM migration, snapshotting, databases), undo and redo logs.

FIG. 1 is a functional diagram illustrating a programmed computer system for distributed workflows in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The block processor 102 may also include a coprocessor (not shown) as a supplemental processing component to aid the processor and/or memory 110. As will be described below, the memory 110 may be coupled to the processor 102 via a memory controller (not shown) and/or a coprocessor (not shown), and the memory 110 may be a conventional memory, a structured memory, or a combination thereof.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
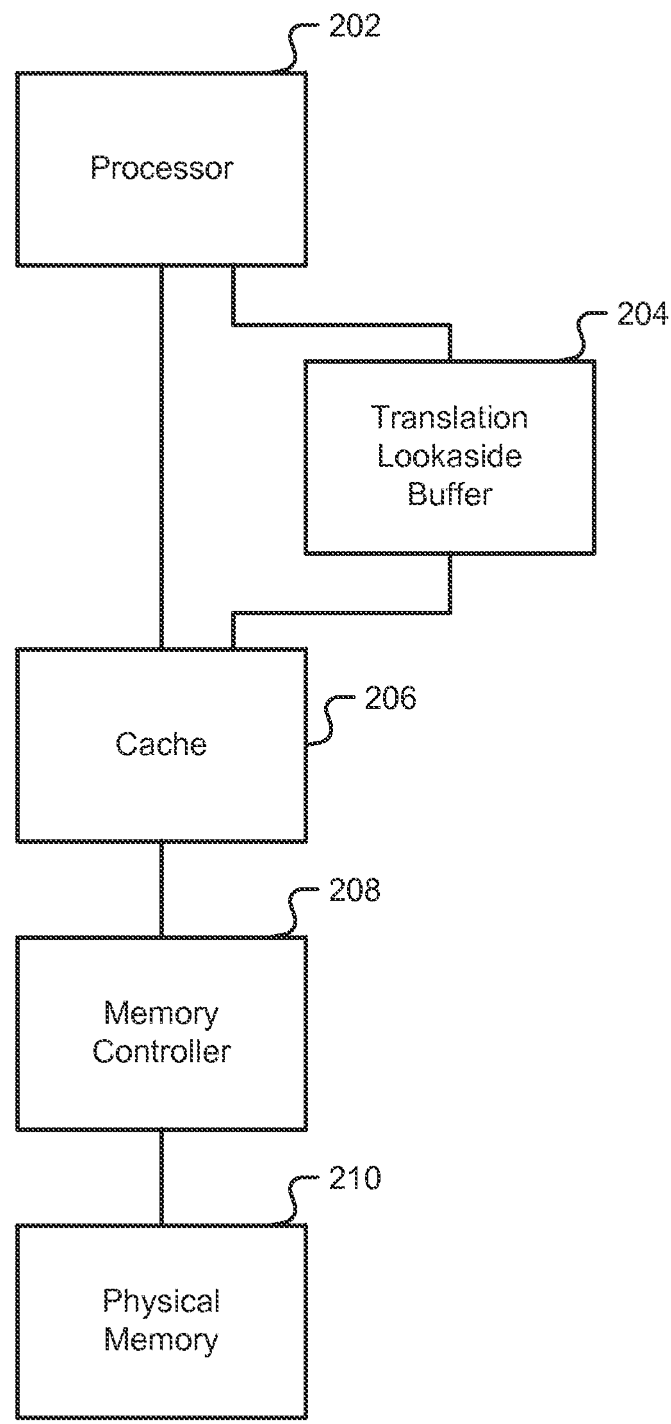
FIG. 2 is a block diagram illustrating an embodiment of an architecture for hardware-supported per-process metadata tags.

FIG. 2 is a block diagram illustrating an embodiment of an architecture for hardware-supported per-process metadata tags. In some embodiments the system in FIG. 2 is included between processor 102 and memory 110 in FIG. 1.

Processor 202 is coupled to a TLB 204 and to cache 206 or multiple levels of caches. As will be described below, the processor 202 may also comprise a coprocessor (not shown) on a memory bus/interconnect to interface, for example, a conventional processor 202 with a structured memory 210. The TLB 204 is a buffer used to improve virtual address translation speed by mapping virtual and physical address spaces. The cache 206 is the physical memory cache (including virtually indexed and physically tagged cache) and coupled to a memory controller 208 and physical memory 210. Throughout this specification: physical memory is defined as memory realized by a real electronic random-access memory (RAM) device; a physical address references a portion of physical memory; and a virtual address may or may not map to a physical address.

For example, an application requests reading data at an address. The address is a virtual address such that processor requests the data from TLB 204, which in turn requests the data from cache 206 at the corresponding physical address. Alternately, TLB and virtually indexed, physically tagged L1 cache are accessed in parallel to reduce latency. In the event the data is not in caches 206, the cache requests the data from memory controller 208 and physical memory 210.

Supplementing existing virtual memory systems, memory controller 208 and physical memory 210 provide indirection between a physical address and physical memory at a granularity level smaller than a page. Indirect and deduplicated lines can also be cached for performance.

Figure 3A:
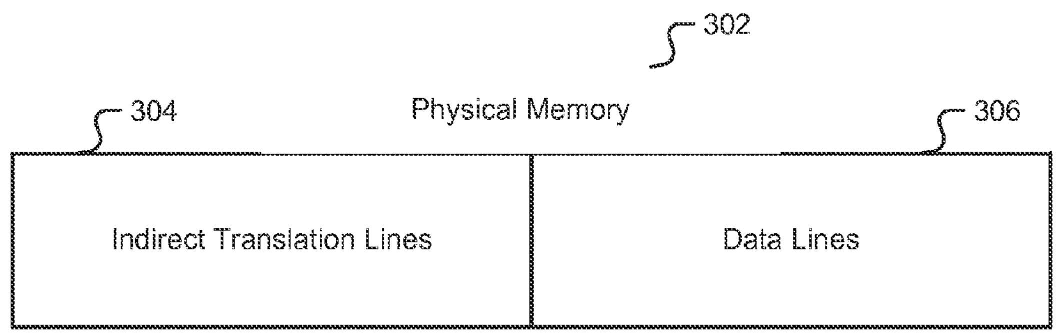
FIG. 3A is an illustration of a physical memory system providing indirection.

FIG. 3A is an illustration of a physical memory system providing indirection. In some embodiments the system in FIG. 3A is associated with the memory controller 208 and/or physical memory 210 of FIG. 2. Throughout this specification, such a physical memory may be referred to generally as a structured memory.

Physical memory 302 is partitioned into lines. Throughout this specification, a line refers to a unit of memory. A line may contain one or more words of memory. Thus physical memory 302 is partitioned into indirect translation lines 304 and data lines 306.

Figure 3B:
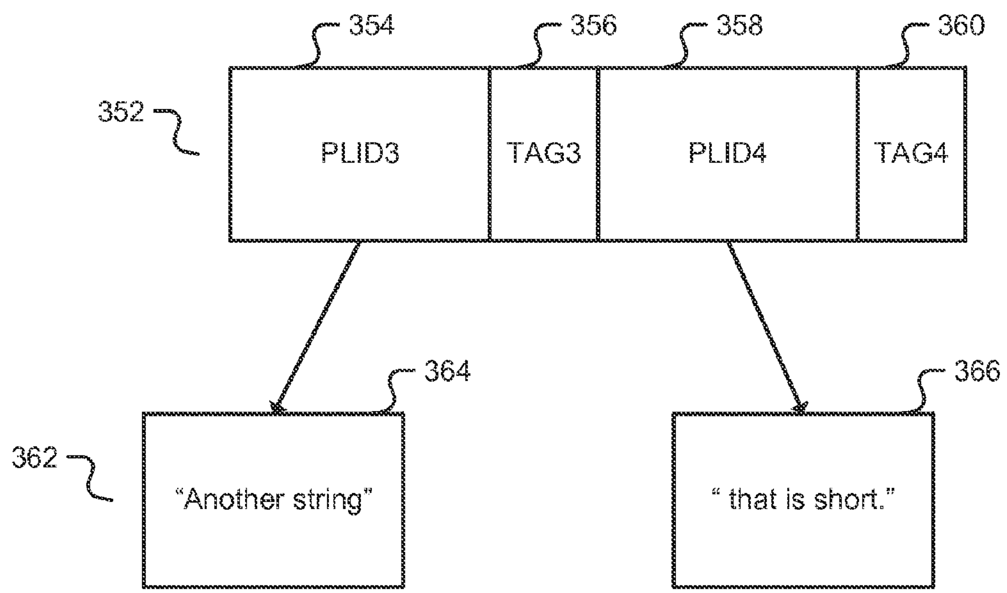
FIG. 3B is a logical diagram illustrating an embodiment of a structured memory.

FIG. 3B is a logical diagram illustrating an embodiment of a structured memory. In some embodiments the structured memory in FIG. 3B is associated with the physical memory 302 of FIG. 3A.

Indirect translation line 352 comprises two PLIDs and their associated tags; PLID 3 (354) with its tag (356), and PLID 4 (358) with its tag (360). Indirect translation line 352 points generally to data lines 362; PLID 3 (354) points to data line (364) containing a string "Another string", and PLID 4 (358) points to data line (366) containing a string "that is short."

Example of Structured Memory: HICAMP

One example of a structured memory system/architecture is HICAMP (Hierarchical Immutable Content-Addressable Memory Processor) as described in U.S. Pat. No. 7,650,460 which is hereby incorporated by reference in its entirety.

The HICAMP architecture is based on the following key three ideas:

1. content-unique lines: memory is an array of small fixed-size lines, each addressed by a physical line ID, or PLID, with each line in memory having a unique content that is immutable over its lifetime.

2. memory segments and segment map: memory is accessed as a number of segments, where each segment is structured as a DAG of memory lines. Segment table maps each segment to the PLID that represents the root of the DAG. Segments are identified and accessed by Segment IDs ("SegIDs").

3. iterator registers: special-purpose registers in the processor that allow efficient access to data stored in the segments, including loading data from the DAG, iteration, perfetching and updates of the segment contents.

Content-Unique Lines.

The HICAMP main memory is divided into lines, each with a fixed size, such as 16, 32 or 64 bytes. Each line has a unique content that is immutable during its lifetime. Uniqueness and immutability of lines is guaranteed and maintained by a duplicate suppression mechanism in the memory system. In particular, the memory system can either read a line by its PLID, similar to read operations in conventional memory systems, as well as look up by content, instead of writing. Look up by content operation returns a PLID for the memory line, allocating line and assigning it a new PLID if such content was not present before. When the processor needs to modify a line, to effectively write new data into memory, it requests a PLID for a line with the specified/modified content. In some embodiments, a separate portion of the memory operates in conventional memory mode, for thread stacks and other purposes, which can be accessed with conventional read and write operations.

The PLIDs are a hardware-protected data type to ensure that software cannot create them directly. Each word in the memory line and processor registers has alternate tags which indicate whether it contains a PLID and software is precluded from directly storing a PLID in a register or memory line. Consequently and necessarily, HICAMP provides protected references in which an application thread can only access content that it has created or for which the PLID has been explicitly passed to it.

Segments.

A variable-sized, logically contiguous block of memory in HICAMP is referred to as a segment and is represented as a directed acyclic graph ("DAG") constructed of fixed size lines as illustrated in FIG. 3B. The data elements are stored at the leaf lines of the DAG.

Each segment follows a canonical representation in which leaf lines are filled from the left to right. As a consequence of this rule and the duplicate suppression by the memory system, each possible segment content has a unique representation in memory. In particular, if the character string of FIG. 3B is instantiated again by software, the result is a reference to the same DAG which already exists. In this way, the content-uniqueness property is extended to memory segments. Furthermore, two memory segments in HICAMP can be compared for equality in a simple single-instruction comparison of the PLIDs of their root lines, independent of their size.

When contents of a segment are modified by creating a new leaf line, the PLID of the new leaf replaces the old PLID in the parent line. This effectively creates new content for the parent line, consequently acquiring a new PLID for the parent and replacing it in the level above. Continuing this operation, new PLIDs replace the old ones all the way up the DAG until a new PLID for the root is acquired.

Each segment in HICAMP is copy-on-write because of the immutability of the allocated lines, i.e. a line does not change its content after being allocated and initialized until it is freed because of the absence of references to it. Consequently, passing the root PLID for a segment to another thread effectively passes this thread a snapshot and a logical copy of the segment contents. Exploiting this property, concurrent threads can efficiently execute with snapshot isolation; each thread simply needs to save the root PLID of all segments of interest and then reference the segments using the corresponding PLIDs. Therefore, each thread has sequential process semantics in spite of concurrent execution of other threads.

A thread in HICAMP uses non-blocking synchronization to perform safe, atomic update of a large segment by:

1. saving the root PLID for the original segment;

2. modifying the segment updating the contents and producing a new root PLID;

3. using a compare-and-swap ("CAS") instruction or similar to atomically replace the original root PLID with the new root PLID, if the root PLID for the segment has not been changed by another thread, and otherwise retrying as with conventional CAS.

In effect, the inexpensive logical copy and copy-on-write in HICAMP makes Herlihy's theoretical construction showing CAS as sufficient actually practical to use in real applications. Because of the line-level duplicate suppression, HICAMP maximizes the sharing between the original copy of the segment and the new one. For example, if the string in FIG. 3B was modified to add the extra characters "append to string", the memory then contains the segment corresponding to the string, sharing all the lines of the original segment, simply extended with additional lines to store the additional content and the extra internal lines necessary to form the DAG.

Iterator Registers.

In HICAMP, all memory accesses go through special registers referred to as iterator registers. An iterator register effectively points to a data element in a segment. It caches the path through the segment from the root PLID of the DAG to the element it is pointing to, as well as element itself, ideally the whole leaf line. Thus, an ALU operation that specifies a source operand as an iterator register accesses the value of the current element the same way as a conventional register operand. The iterator register also allows its current offset, or index within the segment, to be read.

Iterator registers support a special increment operation that moves the iterator register's pointer to the next (non-null) element in the segment. In HICAMP, a leaf line that contains all zeroes is a special line and is always assigned PLID of zero. Thus, an interior line that references this zero line is also identified by PLID zero. Therefore, the hardware can easily detect which portions of the DAG contain zero elements and move the iterator register's position to the next non-zero memory line. Moreover, caching of the path to the current position means that the register only loads new lines on the path to the next element beyond those it already has cached. In the case of the next location being contained in the same line, no memory access is required to access the next element.

Using the knowledge of the DAG structure, the iterator registers can also automatically prefetch memory lines in response to sequential accesses to elements of the segment. Upon loading the iterator register, the register automatically prefetches the lines down to and including the line containing the data element at the specified offset. HICAMP uses a number of optimization and implementation techniques that reduces its associated overheads.

In a preferred embodiment, some of the benefits of HICAMP can be provided to a conventional processor/system by providing HICAMP capabilities as a specialized coprocessor and providing regions of the physical address space with read/write access to HICAMP memory by the conventional processors and associated operating system as disclosed in related U.S. patent application Ser. No. 12/784,268, which is hereby incorporated by reference in its entirety. Throughout this specification, the coprocessor may be referred to interchangeably as "SITE".

This direction is facilitated by several modern processors being designed with shared memory processor ("SMP") extensibility in the form of a memory-coherent high-performance external bus. Throughout this specification "interconnect" refers broadly to any inter-chip bus, on-chip bus, point-to-point links, point-to-point connection, multi-drop interconnection, electrical connection, interconnection standard, or any subsystem to transfer signals between components/subcomponents. Throughout this specification "bus" and "memory bus" refers broadly to any interconnect. For example, the AMD Opteron processor supports the coherent HyperTransport™ ("cHT") bus and Intel processors support the QuickPath Interconnect™ ("QPI") bus. This facility allows a third party chip to participate in the memory transactions of the conventional processors, responding to read requests, generating invalidations and handling write/write-back requests. This third party chip only has to implement the processor protocol; there is no restriction on how these operations are implemented internal to the chip.

SITE exploits this memory bus extensibility to provide some of the benefits of HICAMP without requiring a full processor with the software support/tool chain to run arbitrary application code SITE may appear as a specialized processor which supports one or more execution contexts plus an instruction set for acting on a structured memory system that it implements. In some embodiments, each context is exported as a physical page, allowing each to be mapped separately to a different process, allowing direct memory access subsequently without OS intervention yet providing isolation between processes. Within an execution context, SITE supports defining one or more regions, where each region is a consecutive range of physical addresses on the memory bus.

Each region maps to a structured memory physical segment. As such, a region has an associated iterator register, providing efficient access to the current segment. The segment also remains referenced as long as the physical region remains configured. These regions may be aligned on a sensible boundary, such as 1 Mbyte boundaries to minimize the number of mappings required. SITE has its own local DRAM, providing a structured memory implementation of segments in this DRAM.

In the HICAMP example, SITE supports a segment map indexed by virtual segment id ("VSID"), where each entry points to the root physical line identification ("PLID") of a segment plus flags indicating merge-update, etc. Each iterator register records the VSID of the segment it has loaded and supports conditional commit of the modified segment, updating the segment map entry on commit if it has not changed. If flagged as merge-update, it attempts a merge. Similarly, a region can be synched to its corresponding segment, namely to the last committed state of the segment. The segment table entry can be expanded to hold more previous segments as well as statistics on the segment. VSIDs have either system-wide scope or else scope per segment map, if there are multiple segment maps. This allows segments to be shared between processes. SITE may also interface to a network interconnect such as Infiniband to allow connection to other nodes. This allows efficient RDMA between nodes, including remote checkpoints. SITE may also interface to FLASH memory to allow persistence and logging.

In some embodiments, a basic model of operation is used where SITE is the memory controller and all segment management operations (allocation, conversion, commit, etc.) occur implicitly and are abstracted away from software.

In some embodiments, SITE is implemented effectively as a version of a HICAMP processor, but extended with a network connection, where the line read and write operations and "instructions" are generated from requests over a Hyper Transport or QPI or other bus rather than local processor cores. The combination of the Hyper Transport or QPI or other bus interface module and region mapper simply produces line read and write requests against an iterator register, which then interfaces to the rest of the HICAMP memory system/controller 110. In some embodiments, coprocessor 108 extracts VSIDs from the (physical) memory address of the memory request sent by the processor 102.

In some embodiments, SITE includes a processor/microcontroller to implement, for example, notification, merge-update, and configuration in firmware, thus not requiring hardware logic.

Each SITE context is assigned a separate page location in the physical address space so it can be allocated and mapped by the operating system ("OS"), thereby allowing the process to write directly. Thus, an OS process is coupled to a SITE context and can only perform instructions on the regions/iterator registers within that context. In this way, protection between processes is preserved in SITE.

Each of the iterative operations, for example indexed-join or make-inverted-index, can be implemented as a firmware-driven iteration using basic HICAMP operations. This is in contrast to a dedicated HICAMP processor, where iterative operations are implemented by a loop instruction, looping over the basic instructions to read and write through iterator registers.

Notifications are generated by the iterator register comparing lines against the previous segment, as required for merge-update. If a line differs from the previous segment, for example it is currently committed; a notification record is queued for each processor that is interested. A merged line is produced if the segment is flagged as merge-update and the new and old lines can be merged. In some embodiments this can be defined as a "weak reference" as disclosed in related U.S. Patent Application 61/273,177, which is hereby incorporated by reference in its entirety.

Other Structured Memory Besides HICAMP

The techniques disclosed for hardware-supported per-process metadata tagging are generic to HICAMP, which is simply an example of a memory that includes indirection between physical addresses and physical memory. In particular, while HICAMP includes an indirect data structure, HICAMP also includes immutability and deduplication; the techniques disclosed for hardware-supported per-process metadata tagging do not require immutability and deduplication.

Thus without loss of generality, throughout this specification HICAMP is used as a specific example of a memory that includes indirection, but any person having ordinary skill in the art would recognize that hardware-supported per-process metadata tagging may be applied to other memory architectures with indirect data structures.

Figure 4:
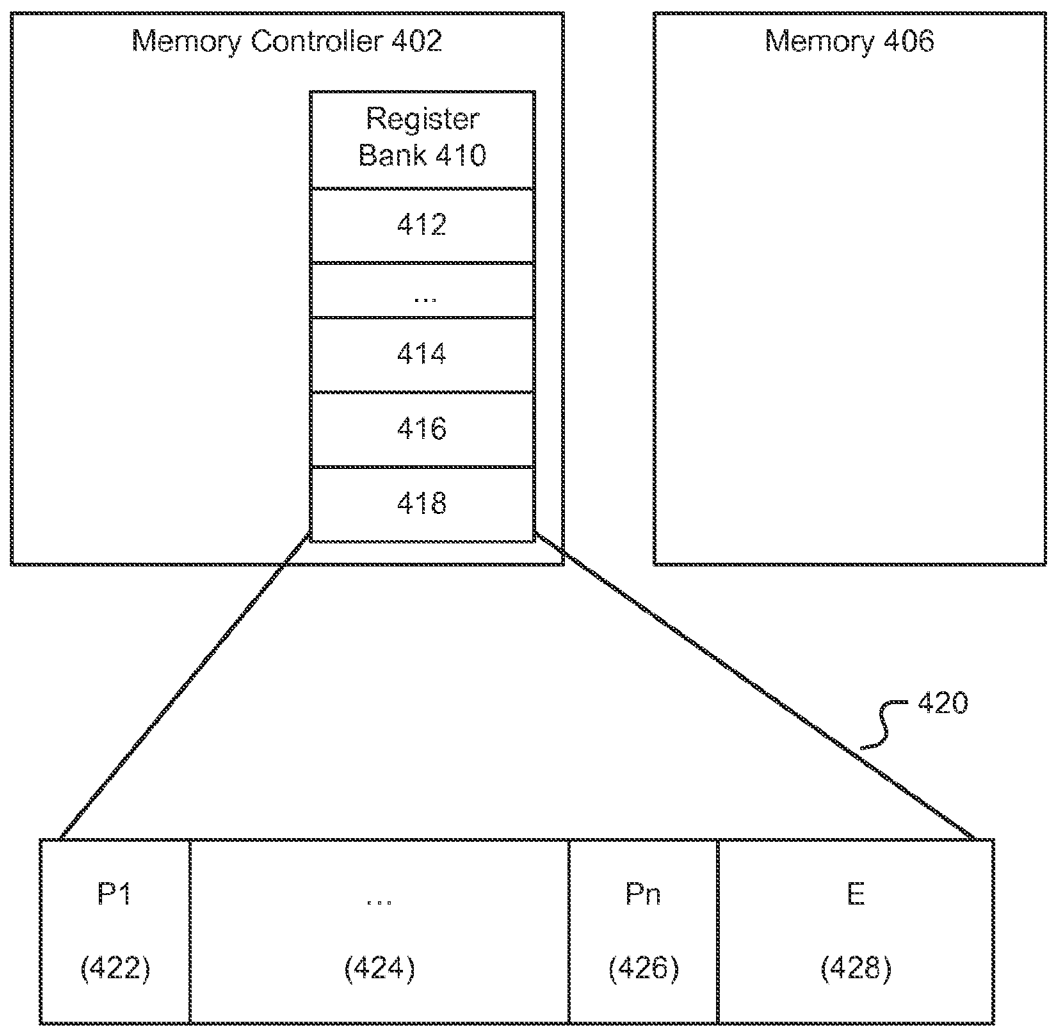
FIG. 4 is an illustration of an embodiment for an iterator register.

FIG. 4 is an illustration of an embodiment for an iterator register. In some embodiments, the iterator register of FIG. 4 is included in the memory controller 208 of FIG. 2.

In this example, a memory controller 402 includes a register bank 410. Some of the registers in bank 410 are labeled as 412, 414, 416, and 418. The registers of register bank 410 are iterator registers. Memory controller 402 is in communication with memory 406, which can include any combination of main and/or cache memory. Memory load operations may entail transfer of data from memory 406 to register bank 410, while memory store operations may entail transfer of data from register bank 410 to memory 406.

An expanded view 420 of iterator register 418 is also shown in FIG. 4. This view shows example fields within the iterator registers. More specifically, a first field 422 provides storage for a first pointer P1, and a second field 426 provides storage for a second pointer Pn. Optionally, one or more additional pointer fields 424 can be present in the iterator register that provide storage for one or more additional pointers. The two or more pointers stored in pointer fields of an iterator register form a pointer chain as described above that leads to a data element E. In a preferred embodiment, iterator registers include a field 428 to provide storage for data element E, but this is not required. Storage for data element E can be provided elsewhere within the system; for example in memory 406, either in main memory or cache memory.

In some embodiments, a system is extended with a specific set of registers in each controller, designated as iterator registers. Each iterator register is designed with knowledge of the in-memory data structures used by the software, and is thus able to provide efficient positioning of access, loading of data, storing of data and modification to the data structure as well as atomic update.

In one embodiment, the architecture supports representation of a variable-sized array using a DAG. A specific item in the array can be accessed by traversing from the root of the DAG to the leaf node corresponding to the designated offset. By maintaining a quasi-balanced representation, the cost of access can be bounded to be proportional log(N) levels, where N is the number of elements in the array. In this embodiment, when an iterator register is loaded as a register referring to an array, it loads the intermediate nodes; that is, a pointer chain, in the DAG from the root to the designated leaf in the DAG. Consequently, a subsequent load of the datum at the designated offset in the array can be accessed in a single memory access, namely in the portion of the leaf node identified when the iterator register is loaded. All this state can be transferred from one iterator register to another as a single iterator register move instruction.

Repositioning of an iterator register within an array is also efficient because it can reuse the intermediate nodes it currently has loaded if the new position is close to the current position. A common case is in fact moving the iterator register to the next datum in the array. In particular, in an embodiment, the iterator register supports post auto-increment in combination with accessing a datum through the iterator register. This increment automatically moves the position by the size of the array data elements. Moreover, an auto-increment iterator access can set the condition codes according to whether the iterator has reached the end of the segment/array, eliminating the need for a separate test for this condition. Finally, in an embodiment an iterator register can prefetch the data at the new position of the iterator register, if the iterator is not passed the end of the array.

Figure 5:
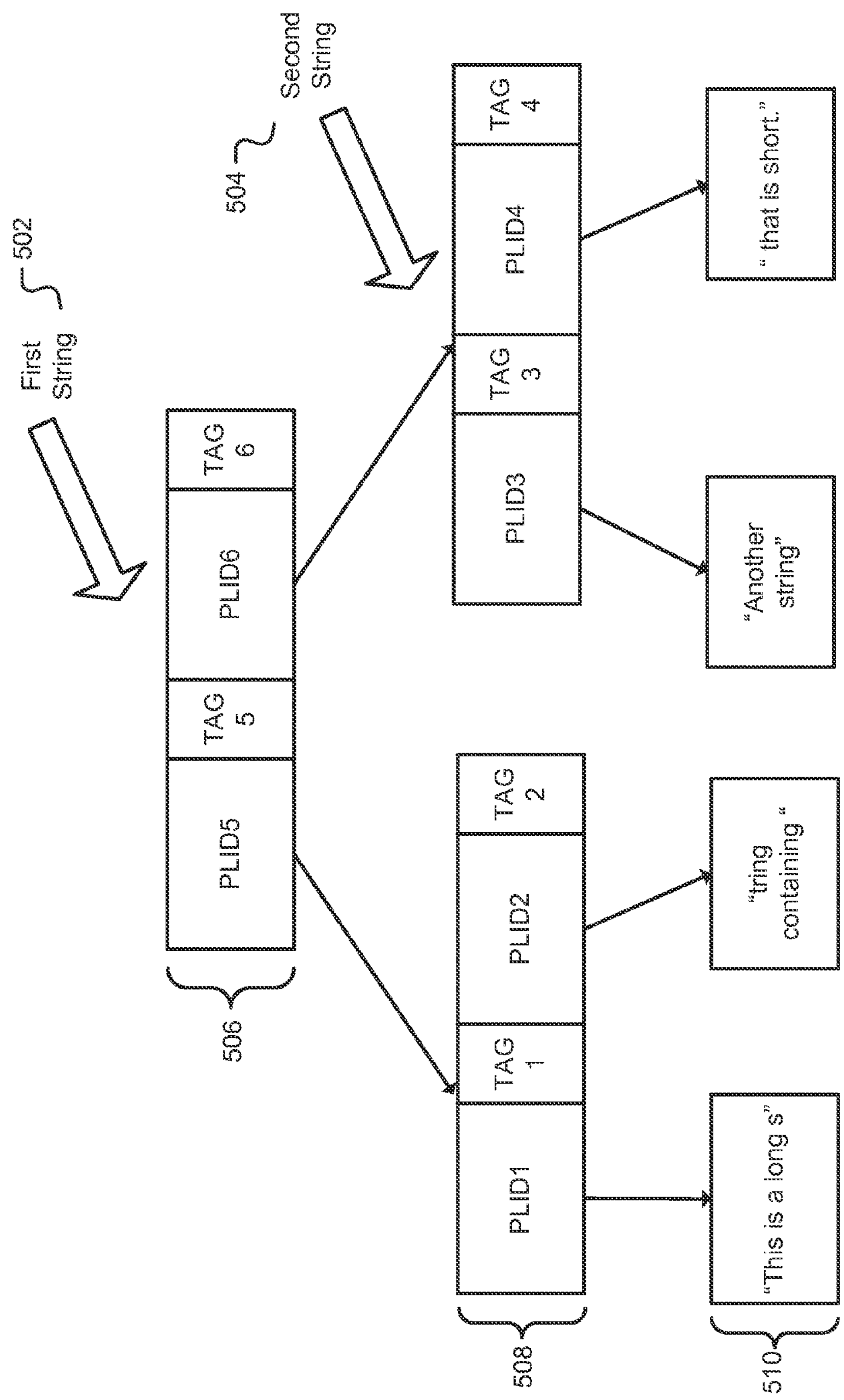
FIG. 5 is a block diagram illustrating an embodiment of a memory supporting multiple levels of indirection.

FIG. 5 is a block diagram illustrating an embodiment of a memory supporting multiple levels of indirection. In some embodiments the structured memory in FIG. 5 is associated with the physical memory 302 of FIG. 3A. This figure shows two memory segments representing two strings, the second string 504 being a substring of the first string 502. Note that the second string 504 shares all the lines of the first string 502, given the latter is a substring of the former. The data elements are stored at the leaf lines 510 of the DAG.

In one embodiment, the memory supports multiple levels of indirect lines where the tags at a second-level indirect line 506 can be used as metadata associated with each first-level indirect line 508, similarly for higher levels. For example, a second-level tag "TAG 5" can be set if any data element associated with the corresponding first-level indirect line requires special processing, such as those associated with PLID1 and PLID2 in FIG. 5.

Reference Count.

In one embodiment, data lines are reference-counted so each data line can be referenced by multiple indirect lines and is automatically reclaimed by the hardware/memory controller when no indirect line is referring to the data line. In the case of multiple levels of indirect lines; for example as shown in FIG. 5, indirect lines can be shared as well.

Deduplication.

In one embodiment, hardware deduplication is applied to the data lines to reduce the amount of space required; for example, with the HICAMP architecture, compensating in part for the extra space required by the indirect lines and the tags. Two or more logically separate lines containing the same content are thus mapped to the same physical memory line.

This facility also reduces the time overhead of the indirect line because the deduplication results in improved data cache behavior.

In the case of multiple levels of indirect lines, hardware deduplication may also be applied to the indirect lines and their corresponding tags. Thus, for example, if a first application applies tags to a data structure, and a second application uses the same precise tags with the data structure, deduplication would reduce the amount of space required both for the data lines as well as the indirect lines including tags. In one embodiment, the tag payload would be immutable if the indirect lines are deduplicated.

Conflict.

In one embodiment, a copy of the indirect line for a second application is not made when some application and/or system knowledge is available that indicates no metadata conflict arises with another process. This may be a static process, wherein some contract indicates no metadata conflict will ever arise with another process, because for example an application has no interest; for example, does not read, metadata/tags. In a preferred embodiment, this is a dynamic process that, for example, detects a write to an existing tag, inconsistent with what a previous application has written to that tag, and at the point of detection/runtime copies and links the indirect line, pulling the metadata conflict apart.

Hardware-Settable Tags.

In one embodiment, a portion of the metadata is controlled by the hardware system. For example, a dirty or modified metadata bit/tag is set by a hardware controller/processor when an associated data line is modified. Another example is that this modified bid/tag is also set when the associated pointer to the data line is changed to point to a different data line. For example, in the case of the dirty bits, these can be cleared at an application-specific time, so have application-specific semantics as in “modified since time t”, where t was determined by the application.

Iterator Registers.

In one embodiment with iterator registers such as the HICAMP architecture, the iterator register supports maintaining the metadata state, skipping over members of a collection except for those that are flagged with the matching metadata. It also supports efficient reading, setting, clearing and reclaiming the metadata as part of iterator register access.

Figure 6:
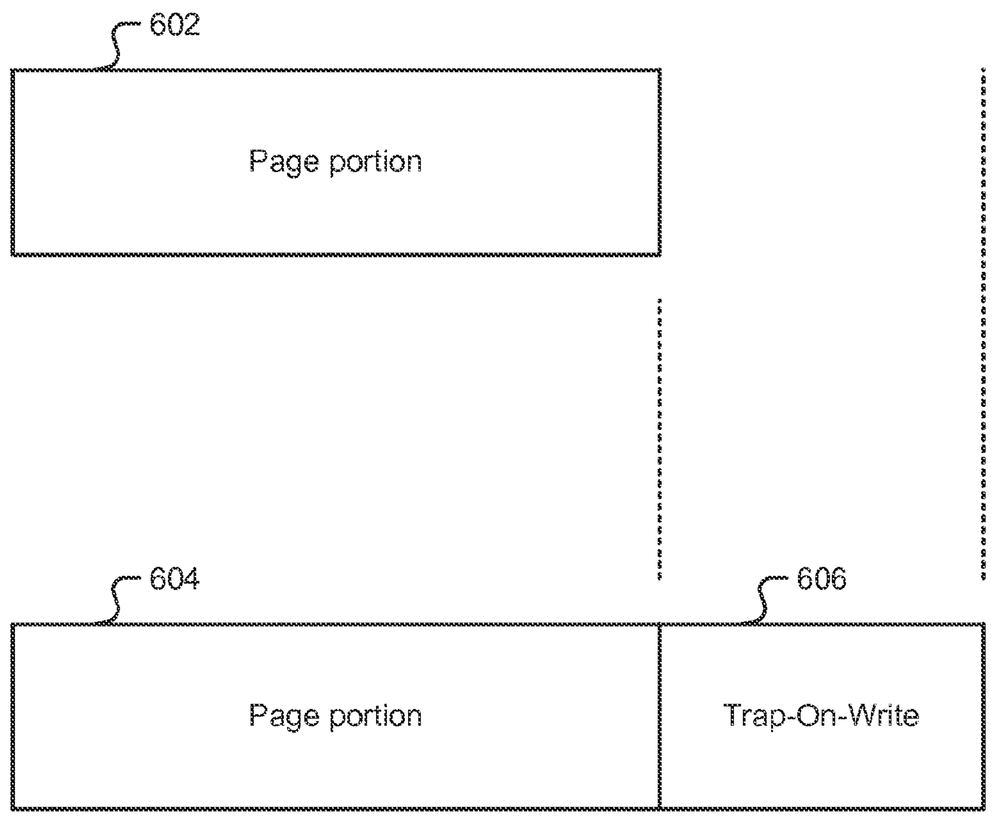
FIG. 6 is a diagram illustrating an embodiment of memory protection with hardware-supported tags.

FIG. 6 is a diagram illustrating an embodiment of memory protection with hardware-supported tags. For an application which is allocated a portion of a page 602, the hardware and/or software can allocate the portion of the page 604 along with the remainder of the page 606 with a trap-on-write tag set, to detect overrun to unallocated memory. This provides early detection of memory overrun. This can be used at compile time and/or at runtime.

Early Detection/Memory Protection.

In one embodiment, a metadata tag can indicate trap-on-write 606. Further, the embodiment can provide a processor trap to a separate processing element when an attempt is made to write to a line that is thus tagged. For example, this separate processing element is a software routine that takes action on this invocation.

Using this mechanism, the processing element can implement fine-grain protection within an address space. In particular, it can prevent writing to unallocated memory by setting the unallocated memory with this tag for each line in the unallocated memory. It can also detect buffer overrun and stack overflow errors. In a distributed shared memory implementation, it can use this mechanism to implement fine-grain sharing.

In one embodiment using caching, the metadata tag can cause a trap at the point that the line is loaded with exclusive; that is, write, access into the cache. In these systems, it is necessary to flush each data line from the cache when its metadata tag is changed to ensure such a load takes place before further access.

In one embodiment, a metadata tag can indicate trap-on-read, similar to the trap-on-write; that is, on a processor load of this line. Using this trap-on-read capability, the processing element can implement an efficient means to detect attempts to read unallocated memory and attempts to read allocated memory before it is initialized. It can also be used to reduce false positives in detecting potential memory leaks in an application, by detecting a candidate memory leak area as being accessed by the application.

With both trap-on-write and trap-on-read, the indicated applications have been realized in the prior art by:

1. Operating with page granularity on data and using page protection bits, which suffers considerable inefficiency because of the coarse granularity of pages; or 2. Proposing specialized fine-grain memory protection scheme, such as the Mondrian Memory Protection (MMP), which unfortunately requires extensive changes to the processor virtual memory support and the associated operating system support, and thus has not been implemented.

By contrast, the disclosed metadata tagging requires no such changes and is efficient in comparison.

In one embodiment, the two metadata tags above for write and read are combined into a single trap-on-access to save on memory for metadata tags. In this case, the processor traps are read or write to the line from memory. The trap processing element then determines whether a read or write access took place, and processes the trap accordingly. In the case of a cached system and the application wanting to effectively implement trap-on-write, a trap-on-access also occurs when a line is changed from shared (read-only) to exclusive (write access).

Figure 7:
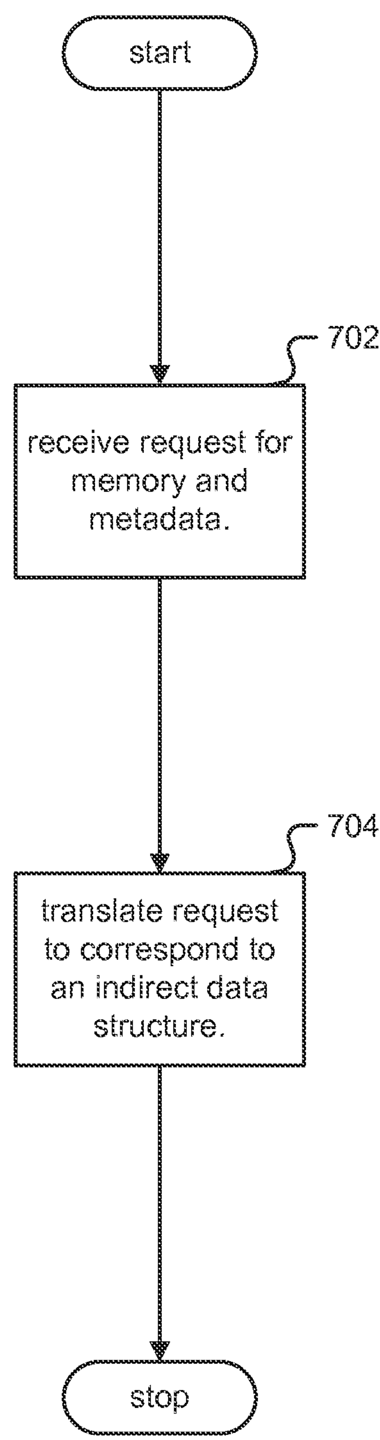
FIG. 7 is a flow chart illustrating an embodiment of hardware-supported per-process metadata tags.

FIG. 7 is a flow chart illustrating an embodiment of hardware-supported per-process metadata tags. In some embodiments, the memory controller 208 of FIG. 2 is configured to execute the method of FIG. 7.

In step 702, a request is received for a portion of the physical memory 210 and metadata associated with the portion of the physical memory. The request may be either a read/load request or a write/store request of either the data and/or metadata, separate or combined. The request may be from one or more of the following: an application, a process, an I/O hardware system, and a memory hardware system. The metadata may for example be writable by a hardware device. Metadata includes one or more of the following: an individually software-settable bit, an individually software-settable flag, and an individually software-settable tag.

In step 704, the request is translated to correspond to an indirect data structure, for example in physical memory. The indirect data structure comprises a reference to a data line, and a metadata associated with the data line; and the data line is formed within the physical memory 210. An example of the indirect data structure is the indirect translation line 352 in FIG. 3B. In one embodiment, the data line may be reference-counted and automatically released when its reference count goes to zero. In one embodiment, the data line may be deduplicated and/or the indirect data structure may be deduplicated. In one embodiment, the metadata is accessed and maintained using an iterator register (420) state. In one embodiment, the indirect data structure is sharable.

Figure 8:
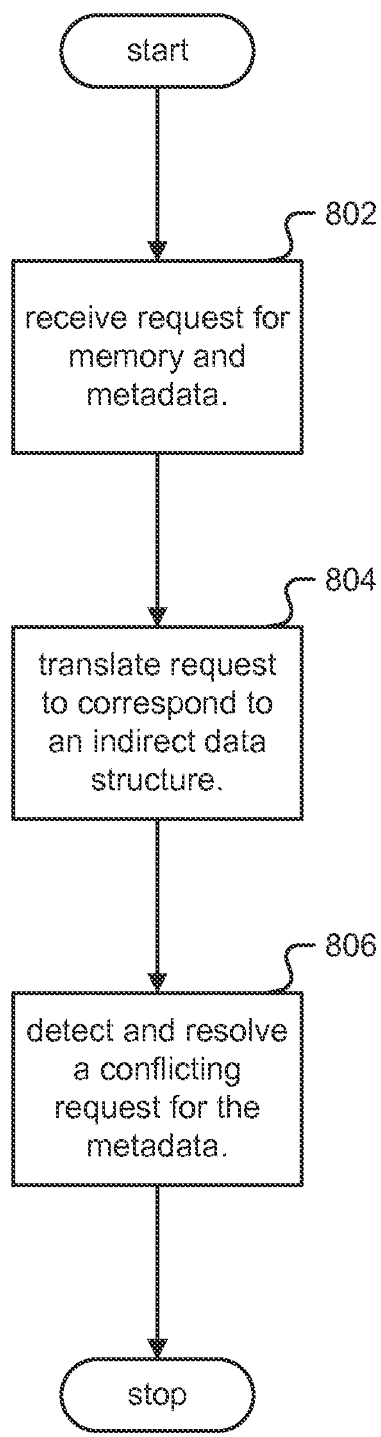
FIG. 8 is a flow chart illustrating an embodiment of hardware-supported per-process metadata tags with conflict detection.

FIG. 8 is a flow chart illustrating an embodiment of hardware-supported per-process metadata tags with conflict detection. In some embodiments, the memory controller 208 of FIG. 2 is configured to execute the method of FIG. 8.

Steps 802 and 804 in FIG. 8 correspond to steps 702 and 704 in FIG. 7. In step 806, the memory controller is configured to detect a conflicting request for the metadata; and resolve the conflict. For example, a conflict may be detected in the event that a second request for modification of the metadata is received. For example, a conflict may be resolved at least in part by creating a second indirect data structure comprising a reference to the data line.

In one embodiment, there is a single application-settable metadata tag that effectively designates "special" in some sense. In this embodiment, an application can use this tag to simply indicate the need for special processing, determining and/or re-determining the specific special processing from the collection member data and possibly other information.

In one embodiment, the metadata tags for a given line can have different interpretations depending on information stored elsewhere. For example, information from the page table is provided to indicate how to interpret the metadata tags associated with a line, allowing, for example, the trap-on-read and trap-on-write tag bits to be interpreted as application "special" tags instead.

In one embodiment, the unit of indirection can be a fixed-size page that is the same as the virtual memory page size, a fixed-size memory page that is larger or smaller than the virtual memory page size or a variable-sized segment.

In summary, the disclosed technique allows tags to be stored at the granularity of cache lines on a per-process or per-thread basis without incurring overhead on the storage of data beyond an indirect line mechanism, while the latter allows efficient page copying to provide per-process/thread semantics when data is shared between threads.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer system, comprising:

a physical memory;

a memory controller coupled to the physical memory, configured to:

receive a first request regarding a portion of the physical memory and metadata associated with the portion of the physical memory;

wherein the first request is requested by a first process;

translate the first request for the portion of the physical memory to correspond to a first indirect data structure;

wherein the first indirect data structure comprises:

a physical line reference to a data line within a physical page of the physical memory, and a first metadata associated with the physical line reference;

receive a second request regarding the portion;

wherein the second request is requested by a second process;

in the event a metadata conflict is detected between the first process and the second process:

translate the second request to correspond to a second indirect data structure;

wherein the second indirect data structure comprises:

the physical line reference, and a second metadata associated with the physical line reference;

otherwise in the event no metadata conflict is detected between the first process and the second process:

translate the second request to correspond to the first indirect data structure.

2. A system as recited in claim 1, wherein the memory controller is further configured to:

detect a conflicting request for the first metadata; and resolve the conflict.

3. The system as recited in claim 2, wherein the conflicting request is detected in the event that a new request for modification of the first metadata is received.

4. The system as recited in claim 2, wherein the conflict is resolved at least in part by creating a new indirect data structure comprising the physical line reference.

5. The system as recited in claim 1, wherein the first metadata comprises one or more of the following: an individually software-settable bit, an individually software-settable flag, and an individually software-settable tag.

6. The system as recited in claim 1, wherein the data line is reference-counted and automatically released when its reference count goes to zero.

7. The system as recited in claim 1, wherein the data line is deduplicated.

8. The system as recited in claim 1, wherein the data line is immutable.

9. The system as recited in claim 1, wherein the first indirect data structure is deduplicated.

10. The system as recited in claim 1, wherein the first metadata is accessed and maintained using an iterator register state.

11. The system as recited in claim 1, wherein the first request requested by the first process is from one or more of the following: an application, an I/O hardware system, and a memory hardware system.

12. The system as recited in claim 1, wherein the first request includes a request to modify the first metadata.

13. The system as recited in claim 1, wherein the memory controller is further configured to return data to a requester associated with the first request.

14. The system as recited in claim 1, wherein the first indirect data structure is formed within the physical memory.

15. The system as recited in claim 1, wherein the indirect data structure is sharable.

16. The system as recited in claim 1, wherein the first metadata includes requester-specific state information associated with the data line.

17. The system as recited in claim 1, wherein the first metadata includes data indicating whether the data line is dirty or modified.

18. The system as recited in claim 1, wherein the first metadata includes data indicating whether the reference to the data line is modified.

19. The system as recited in claim 1, wherein the first metadata is used to implement dirty copy operation, that is to create a copy of only data lines which were modified.

20. The system as recited in claim 1, wherein the first metadata includes data indicating whether the data line is trap-on-write.

21. The system as recited in claim 1, wherein the first metadata includes data indicating whether the data line is trap-on-read.

22. The system as recited in claim 1, wherein the first metadata includes data indicating whether the data line is trap-on-access.

23. The system as recited in claim 1, wherein the first metadata is writable by a hardware device.

24. The system as recited in claim 1, wherein the first indirect data structure is hierarchical such that a level associated with the first indirect data structure is one of a plurality of indirect data structures levels.

25. A method comprising:

using a memory controller to receive a first request regarding a portion of a physical memory and metadata associated with the portion of the physical memory;

wherein the first request is requested by a first process;

translating the first request for the portion of the physical memory to correspond to a first indirect data structure;

wherein the first indirect data structure comprises:

a physical line reference to a data line within a physical page of the physical memory, and a first metadata associated with the physical line reference;

using the memory controller to receive a second request regarding the portion;

wherein the second request is requested by a second process;

in the event a metadata conflict is detected between the first process and the second process:

translating the second request to correspond to a second indirect data structure;

wherein the second in direct data structure comprises:

the physical line reference, and a second metadata associated with the physical line reference;

otherwise in the event no metadata conflict is detected between the first process and the second process:

translating the second request to correspond to the first indirect data structure.

26. The method as recited in claim 25, further comprising detecting a conflicting request for the metadata; and resolving the conflict.

* * * * *